July 1, 1930. A. H. OAK 1,769,536

BATTERY CONNECTER CLIP

Filed Jan. 19, 1929

Inventor

Anthony H. Oak,

By Howard A. Coombe

Attorney

UNITED STATES PATENT OFFICE

ANTHONY H. OAK, OF JACKSONVILLE, FLORIDA

BATTERY CONNECTER CLIP

Application filed January 19, 1929. Serial No. 333,631.

This invention relates to connecters for connecting up storage batteries for charging or testing purposes. It is a modification of the device covered by my prior application Ser. No. 83,290, filed Jan. 23, 1926.

It is customary to use, for this purpose, short lengths of insulated wire soldered at their ends to spring jaw clamps. Such connecters usually last for a few months only, because the wires frequently break away from the clamps, as their connections thereto become corroded by the acid of the batteries.

It is one of the objects of my invention to provide a simpler, cheaper and more durable connecter, which is more easily and quickly applied to, and removed from, the battery terminals.

In my application aforesaid, I disclosed various forms of connecter, the simplest consisting of a single piece of bent, curved or coiled spring wire, the ends of which were bent to form V-jaws, coated with lead and adapted to engage the terminals of two adjacent batteries in series, said jaws being held in engagement with the terminals solely by the spring of the wire.

The present improvement consists in attaching jaw pieces to the ends of the wires, presenting V or U-shaped throats on both sides, so that the connecter can be applied to and held in engagement with the terminals either by contraction or expansion.

While this double jaw can be applied to any of the forms of connecter illustrated in my said application, it is not deemed necessary to show more than one form in the present case.

Figure 1:
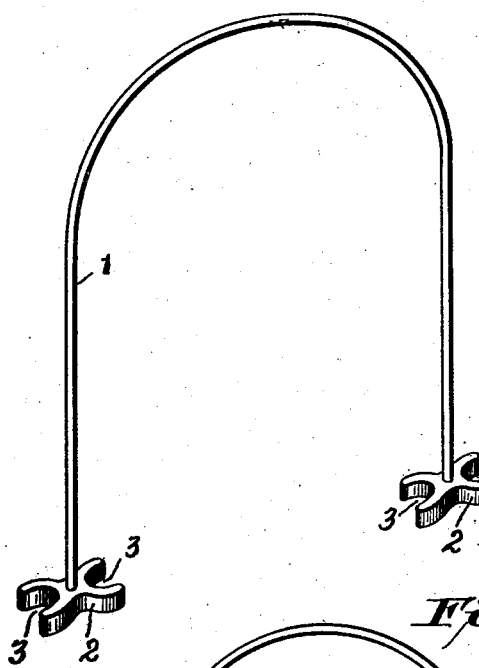
Fig. 1 is a perspective view of the device.
Figure 2:
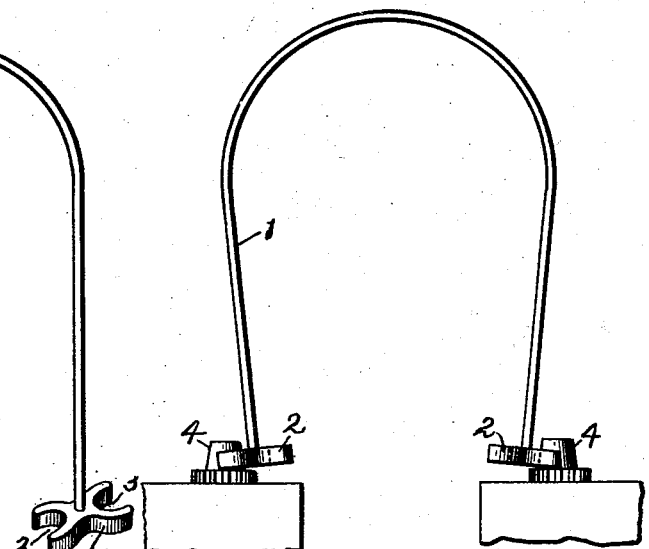
Figs. 2 and 3 show its application to battery terminals by contraction and expansion, respectively.
Figure 3:
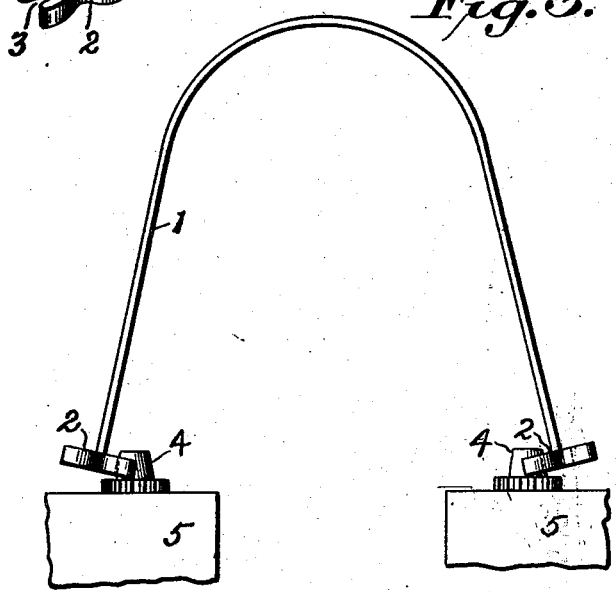
Figure 4:
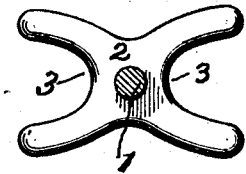
Fig. 4 is a plan view of one of the jaws.

The body 1 of the device is of spring wire, bent or curved to afford the desired resilient clamping action. As above stated, the shape of this curved body is immaterial, as far as the present invention is concerned, and its here shown in its simplest form. To each end of this wire body is attached a jaw member 2, which may be made entirely of lead, or of iron coated with lead, or of any desired composition. Each jaw member presents a U or V-shaped throat 3 on each side of its connection to the wire, whereby the opposed terminals 4 of two batteries 5 can be engaged on either side, the spring clamping effect being obtained in the one case, Fig. 2, by the tendency of the wire to expand and press the jaws against the inner sides of the terminals or, as in Fig. 3, by its tendency to contract and press the jaws against the outer sides of the terminals.

Having thus described my invention what I claim is:

A connecter clip for storage battery terminals, comprising a piece of curved spring wire, and jaws on the ends of the same, each jaw comprising two grooves facing in opposite directions, whereby the clip can be held in engagement with the terminals by either contraction or expansion of the wire.

In testimony whereof I have hereunto set my hand.

ANTHONY H. OAK.